(12) United States Patent
Razavian et al.

(10) Patent No.: US 10,298,530 B2
(45) Date of Patent: May 21, 2019

(54) SCHEDULING EVENTS

(71) Applicant: AirWatch LLC, Atlanta, GA (US)

(72) Inventors: Joseph Nickolas Razavian, Woodstock, GA (US); Suja Ramachandran, Atlanta, GA (US)

(73) Assignee: AIRWATCH LLC, Atlanta, GA (US)

(*) Notice: Subject to any disclaimer, the term of this patent is extended or adjusted under 35 U.S.C. 154(b) by 478 days.

(21) Appl. No.: 14/734,082

(22) Filed: Jun. 9, 2015

(65) Prior Publication Data

US 2016/0366079 A1 Dec. 15, 2016

(51) Int. Cl.
*G06Q 10/10* (2012.01)
*G06F 15/16* (2006.01)
*H04L 12/58* (2006.01)

(52) U.S. Cl.
CPC ......... *H04L 51/18* (2013.01); *G06Q 10/1095* (2013.01)

(58) Field of Classification Search
CPC .................... H04L 51/18; G06Q 10/1095
USPC ....................................... 709/206
See application file for complete search history.

(56) References Cited

U.S. PATENT DOCUMENTS

| | | | | |
|---|---|---|---|---|
| 5,124,912 A * | 6/1992 | Hotaling | ........... | G06Q 10/06314 705/7.19 |
| 5,963,913 A * | 10/1999 | Henneuse | ........ | G06Q 10/06311 705/7.13 |
| 6,016,478 A * | 1/2000 | Zhang | .............. | G06Q 10/06314 705/7.19 |
| 8,065,175 B1 * | 11/2011 | Lewis | ............ | G06Q 10/063116 705/7.19 |
| 8,086,673 B2 * | 12/2011 | Lam | ..................... | G06Q 10/109 709/206 |
| 8,681,808 B1 | 3/2014 | Tessier | | |
| 8,775,534 B2 * | 7/2014 | Laval | ................... | G06Q 10/107 709/206 |
| 9,990,611 B2 * | 6/2018 | Moore | ............... | G06Q 10/1095 |
| 2003/0177194 A1 * | 9/2003 | Crocker | ............. | G06F 21/6218 709/206 |
| 2004/0110490 A1 | 6/2004 | Steele et al. | | |
| 2005/0027779 A1 * | 2/2005 | Schinner | ............. | G06Q 10/107 709/200 |
| 2005/0030939 A1 | 2/2005 | Roy et al. | | |
| 2005/0033847 A1 | 2/2005 | Roy | | |
| 2005/0038915 A1 | 2/2005 | Clarke et al. | | |

(Continued)

OTHER PUBLICATIONS

MillyS and HelpPlease. "Automatically Delete Meeting Accepts". Jun. 15, 2007. Office-Outlook.com. p. 1. (Year: 2007).*

(Continued)

*Primary Examiner* — Imad Hussain
(74) *Attorney, Agent, or Firm* — Thomas | Horstemeyer, LLC

(57) ABSTRACT

Disclosed are examples relating to scheduling events using devices in communication through a network. In some examples, an email message comprising an encoded data element is obtained. The encoded data element includes data that specifies a proposed time for an event. The data that specifies the proposed time for the event is extracted from the encoded data element. Content from the email message is rendered in a user interface. A user interface element is rendered within the user interface. The user interface element represents the proposed time for the event and an availability for the event at the proposed time.

20 Claims, 13 Drawing Sheets

(56) References Cited

U.S. PATENT DOCUMENTS

| | | | |
|---|---|---|---|
| 2005/0041686 A1 | 2/2005 | Roy et al. | |
| 2006/0200374 A1* | 9/2006 | Nelken | G06Q 10/109 705/7.19 |
| 2007/0016646 A1 | 1/2007 | Tendjoukian et al. | |
| 2007/0073810 A1* | 3/2007 | Adams | G06Q 10/107 709/205 |
| 2007/0078925 A1 | 4/2007 | Neil et al. | |
| 2007/0143412 A1* | 6/2007 | Qi | G06Q 10/10 709/206 |
| 2007/0154876 A1* | 7/2007 | Harrison, Jr. | G09B 5/06 434/365 |
| 2007/0213986 A1 | 9/2007 | Bodin et al. | |
| 2007/0244976 A1 | 10/2007 | Carroll et al. | |
| 2007/0288658 A1* | 12/2007 | Lam | G06Q 10/109 709/246 |
| 2008/0015922 A1* | 1/2008 | Nelken | G06Q 10/109 705/7.19 |
| 2008/0040188 A1* | 2/2008 | Klausmeier | G06Q 10/109 705/7.18 |
| 2008/0140498 A1* | 6/2008 | Setty | G06Q 10/109 705/7.18 |
| 2008/0147469 A1* | 6/2008 | Murillo | G06Q 10/10 705/7.19 |
| 2008/0177611 A1* | 7/2008 | Sommers | G06Q 10/109 705/7.19 |
| 2009/0018878 A1* | 1/2009 | Baron | G06Q 10/109 705/7.19 |
| 2009/0024709 A1* | 1/2009 | Moody | G06Q 10/107 709/206 |
| 2009/0040875 A1 | 2/2009 | Buzescu et al. | |
| 2009/0089134 A1* | 4/2009 | Uyeki | G06Q 10/02 705/7.19 |
| 2009/0100347 A1* | 4/2009 | Schemers | G06Q 10/109 715/751 |
| 2009/0157466 A1* | 6/2009 | Bank | G06Q 10/109 705/7.19 |
| 2010/0131866 A1 | 5/2010 | Nielsen et al. | |
| 2010/0191566 A1* | 7/2010 | Loring | G06Q 10/107 705/7.19 |
| 2010/0198921 A1* | 8/2010 | Choi | G06F 15/16 709/206 |
| 2010/0293029 A1 | 11/2010 | Olliphant | |
| 2010/0306327 A1* | 12/2010 | Shinkawa | G06Q 10/109 709/206 |
| 2011/0125545 A1 | 5/2011 | Lehmann et al. | |
| 2011/0289433 A1 | 11/2011 | Whalin et al. | |
| 2012/0078676 A1* | 3/2012 | Adams | G06Q 10/063 705/7.22 |
| 2012/0166312 A1 | 6/2012 | Rao | |
| 2012/0278381 A1* | 11/2012 | Ferlitsch | G06Q 10/109 709/203 |
| 2013/0067302 A1 | 3/2013 | Chen et al. | |
| 2013/0246526 A1* | 9/2013 | Wu | G06Q 10/109 709/204 |
| 2013/0263020 A1 | 10/2013 | Heiferman et al. | |
| 2013/0290188 A1 | 10/2013 | Olliphant | |
| 2014/0046717 A1 | 2/2014 | Yuan et al. | |
| 2014/0257902 A1* | 9/2014 | Moore | G06Q 10/1093 705/7.18 |
| 2014/0280623 A1 | 9/2014 | Duan | |
| 2014/0288990 A1* | 9/2014 | Moore | G06Q 10/1095 705/7.19 |
| 2015/0341300 A1 | 11/2015 | Swain et al. | |
| 2016/0179771 A1* | 6/2016 | Mizumoto | G06F 17/2247 715/273 |
| 2016/0247124 A1 | 8/2016 | Hoist et al. | |
| 2016/0357861 A1* | 12/2016 | Carlhian | G06F 17/278 |
| 2016/0366078 A1* | 12/2016 | Razavian | H04L 51/18 |
| 2016/0366079 A1* | 12/2016 | Razavian | H04L 51/18 |

OTHER PUBLICATIONS

Non-Final Office Action for U.S. Appl. No. 14/734,075 dated Sep. 8, 2017.

Office Action dated Jan. 11, 2018 for U.S. Appl. No. 14/734,075.

* cited by examiner

SCHEDULING EVENTS

BACKGROUND

Individuals often conduct meetings to discuss various topics. For example, it is common for members of a business organization who work in the same team to conduct meetings to discuss projects on which the team is working. The individuals can meet in person, or they can conduct the meeting through a teleconference or video conference system.

Sometimes, an informal meeting can be initiated and conducted by one person calling another person and then discussing the topic of the meeting through a telephone system. In more formal situations, meeting attendees can coordinate meeting times and locations in advance of the meeting. However, as the number of potential attendees of a meeting grows, the difficulty in scheduling a meeting at a convenient time for the potential attendees can be magnified.

For example, an attendee's availability information might not be accessible due to the attendee belonging to a different organization that uses a separate email or calendar server. Moreover, existing user interfaces to schedule meetings are cumbersome and confusing for users.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to the scheduling of events, such as in-person meetings, telephone conferences, and video conferences. In some examples, the systems described herein facilitate scheduling an event between two individuals. In one such example, a sender device can generate an email message that includes an encoded data element that specifies one or more proposed times for an event. The sender device can embed the encoded data element in the email message and transmit the email message to a recipient device.

When the recipient device receives the email message, the recipient device can render content in the email message in a user interface. In addition, the recipient device can render a user interface element within the user interface that represents the proposed times for the event. In the user interface element, the recipient device can also include representations of whether the user is available to attend the event at each proposed time.

The user of the recipient device can select one of the proposed times for the event, and the recipient client device can create an event entry for an electronic calendar at the selected time. The recipient client device can then transmit an invitation for the event to the sender device that sent the earlier email message. In this way, examples described herein can facilitate two users coordinating the scheduled time for an event.

In other examples, the systems described herein facilitate scheduling an event between three or more individuals. In one such example, a sender device can embed an encoded data element in an email message and transmit the email message to multiple recipient devices. The encoded data element embedded in the email message can specify one or more proposed times for an event.

When the recipient devices receive the email with the encoded data element, the recipient devices can render content in the email message as well as a user interface element that represents the proposed times for the event. The users can select one or more of the proposed times for the event as a time that the user is willing to attend. The recipient devices can then transmit to the sender device a response message that specifies the selected proposed times.

After the sender device collects the response messages from the recipient devices, the sender device can determine a scheduled time for the event based on the proposed times selected by the users of the recipient devices. The sender device can then create an event entry for an electronic calendar at the scheduled time and transmit event invitations to the recipient devices. In this way, examples described herein can facilitate several users coordinating the scheduled time for an event.

In the following discussion, examples of systems and their components are described, followed by examples of the operation of those systems.

Figure 1:
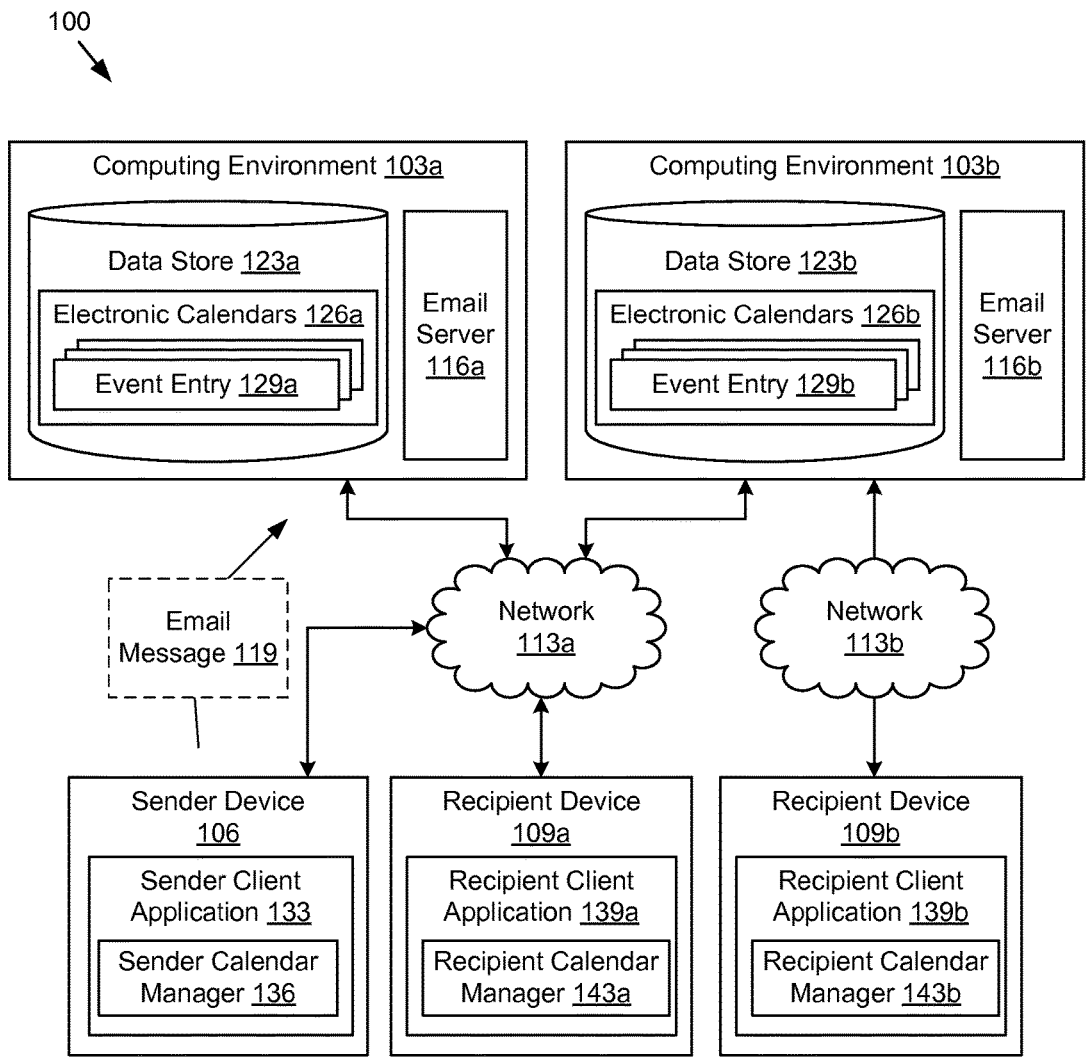
FIG. 1 is a drawing of an example of a networked environment.

With reference to FIG. 1, shown is an example of a networked environment 100. The networked environment 100 can include computing environments 103*a*-103*b*, a sender device 106, and recipient devices 109-109*b*, which are in data communication through networks 113*a*-113*b*. The networks 113 can include the Internet, one or more intranets, extranets, wide area networks (WANs), local area networks (LANs), wired networks, wireless networks, or any combination of two or more such networks. The networks 113 can include satellite networks, cable networks, Ethernet networks, and telephony networks.

The computing environments 103*a*-103*b* can be computing systems that are operated by one or more enterprises, such as businesses or other organizations. In some examples, the organization that operates the computing environment 103*a* can be different from the organization that operates the computing environment 103*b*. The computing environments 103 can include computing devices, such as a server computer, that provides computing capabilities. Alternatively, the computing environments 103 can include multiple computing devices arranged in one or more server banks or computer banks. For examples in which the computing environments 103 include multiple computing devices, the computing devices can be located in a single installation, or the computing devices can be distributed among multiple different geographical locations.

In some examples, the computing environments 103 can include computing devices that together form a hosted computing resource or a grid computing resource. In other examples, the computing environments 103 can operate as an elastic computing resource for which the allotted capacity of computing-related resources, such as processing resources, network resources, and storage resources, vary over time. In other examples, the computing environments 103 can include or be operated as one or more virtualized computer instances that can be executed in order to perform the functionality that is described herein.

The computing environments 103 can execute various systems. For example, the computing environments 103 can include email servers 116a-116b, referred to herein as the email servers 116. The email servers 116 can transfer messages, such as email messages 119, between computing devices, such as the sender device 106 and the recipient devices 109. In particular, the email server 116a can provide email services for the sender device 106 and the recipient device 109, and the email server 116b can provide email services for the recipient device 109b.

In addition, the email servers 116 can provide calendaring services for client devices. Because the sender device 106 and the recipient device 109a can communicate with the same email server 116a, the sender device 106 can have access to calendaring information associated with the sender device 106. However, because the sender device 106 and recipient device 109b can communicate with different email servers 116a-116b that can be operated by different organizations, the sender device 106 may not have access to calendaring information associated with the recipient device 109b.

The email servers 116 can also provide contact managers, which can store and manage names, addresses, telephone numbers, email addresses, and other contact information for individuals and other entities. The techniques described herein coordinate the availability of users across multiple different computing environments 103 and email servers 116 by transmitting encoded data elements. As a result, users in different organizations can easily schedule meetings.

The computing environments 103 can also include data stores 123a-123b. The data stores 123 shown in FIG. 1 are representative of multiple data stores 123 that can be accessible to components of the respective computing environments 103. The data stored in the data stores 123 can include electronic calendars 126a-126b for users associated with the computing environments 103.

The electronic calendars 126 can include event entries 129a-129b representing events and information associated with the events. An event entry 129 for an electronic calendar 126 can include data that represents an event, such as a meeting, scheduled in an electronic calendar 126. In some examples, an event entry 129 can specify a scheduled time, place, and attendees for the appointment. In addition, an event entry 129 can include content, such as word processing documents that are associated with the scheduled event. Although FIG. 1 shows the electronic calendars 126 and event entries 129 stored remotely relative to the sender device 106 and the recipient devices 109, in alternative examples, this data can be stored locally on the respective sender device 106 and recipient devices 109.

The sender device 106 is representative of multiple client devices that can be coupled to the network 113. The sender device 106 can generate and send messages, such as email messages 119, with encoded data elements, which will be described in further detail below. The sender device 106 can include a processor-based computer system, such as a desktop computer, a laptop computer, a personal digital assistant, a mobile phone, or a tablet computer. The sender device 106 can also include output devices, such as a display and audio speakers, as well as one or more input devices, such as a mouse, keyboard, touch pad, or touch screen, which facilitate a user interacting with and controlling the sender device 106.

The sender device 106 can include a sender client application 133. The sender client application 133 can compose and transmit email messages 119 to other devices, such as the recipient devices 109. In addition, the sender client application 133 can receive email messages 119 sent from other devices, such as the recipient devices 109.

The sender client application 133 can also include a sender calendar manager 136. The sender calendar manager 136 can manage one or more electronic calendars 126 associated with the user of the sender device 106. For example, the sender calendar manager 136 can render an electronic calendar 126 for presentation to a user. In addition, the sender calendar manager 136 can create and modify event entries 129 for an electronic calendar 126.

The recipient devices 109 are representative of multiple client devices that can be coupled to the network 113. A recipient device 109 can receive messages, such as email messages 119, that include encoded data elements. The recipient devices 109 can include a respective processor-based computer system, such as a desktop computer, a laptop computer, a personal digital assistant, a mobile phone, or a tablet computer. The recipient devices 109 can also include output devices, such as a display and audio speakers, as well as one or more input devices, such as a mouse, keyboard, touch pad, or touch screen, which facilitate users interacting with and controlling the recipient devices 109.

The recipient devices 109 can include recipient client applications 139a-139b. Similar to the sender client application 133, the recipient client applications 139 can compose and transmit email messages 119 to other devices. In addition, the recipient client applications 139 can receive email messages 119 sent from other devices, such as the sender devices 106.

The recipient client applications 139 can also include recipient calendar managers 143a-143b. A recipient calendar manager 143 can manage an electronic calendar 126 associated with the user of a recipient device 109. For example, the recipient calendar manager 143 can create and modify event entries 129 for an electronic calendar 126.

Next, examples are described of the sender client application 133 and the recipient client application 139 scheduling an event between the user of the sender device 106 and a user of a recipient device 109. To begin, the user of the sender device 106 can use the sender client application 133 to compose an email message 119. As one example, the user can compose an email message 119 with content, such as text, that indicates the user intends to schedule an event with the user of the recipient device 109. The user of the sender device 106 can also include attachments associated with the proposed event with the email message 119. For example, the user can attach an image or word processing document that is associated with the event.

The user of the sender device 106 can also request for the sender calendar manager 136 to include an encoded data element in the email message 119. As will be described in further detail below, the encoded data element can specify one or more proposed times for the event.

When the user requests to include the encoded data element in the email message 119, the sender calendar manager 136 can retrieve the data for an electronic calendar 126 associated with the user of the sender device 106. The sender calendar manager 136 can parse the retrieved calendar data and determine times that the user of the sender device 106 is available for the event being scheduled. For example, if the electronic calendar 126 does not include an event entry 129 indicating that the user is already scheduled to attend another event at a particular time, the sender calendar manager 136 can determine that the user is available for the event at that time. If the electronic calendar 126 includes an event entry 129 indicating that the user is already scheduled to attend another event at a particular time, the sender calendar manager 136 can determine that the user is unavailable for the event at that time.

After the sender calendar manager 136 determines the times when the user of the sender device 106 is available for the event, the sender calendar manager 136 can render the electronic calendar 126 in a user interface. The rendered user interface can represent the times that the user is available for the event as well as times that the user is not available for the event.

The user of the sender device 106 can specify one or more proposed times for the event using the rendered user interface. For example, the user interface can include times the sender calendar manager 136 determined the user is available for an event, and the user can select one or more of those times as proposed times for the event. In addition, the user of the sender device 106 can use the rendered user interface to specify the duration of the event. Furthermore, the user of the sender device 106 can rank the proposed times for event. For example, the user can select three proposed times for the event and specify that a particular proposed time is preferred by the user over the other proposed times.

Once the user has specified the proposed times and duration for the event, the sender calendar manager 136 can generate an encoded data element that specifies the one or more proposed times for the event. According to various examples, the encoded data element can includes encoded data in any format that can be textually represented in an email message 119. In one approach, the encoded data element can include extensible markup language (XML) code that can be decoded by the recipient device 109. For instance, the XML code can include hypertext markup language (HTML) code that can be decoded by the recipient device 109. In one such example, the sender calendar manager 136 can generate HTML code that includes text specifying the proposed times for the event. The sender calendar manager 136 can insert the HTML code into the body of email message 119 along with a marker to indicate to the recipient device 109 that the encoded data element is present in the email message 119. In some examples, the marker can include an HTML tag that the recipient client application 109 can recognize as being a marker to identify that the encoded data element is present in the email message 119. In these examples, the recipient calendar manager 143 can parse the body of the email message 119 to determine whether the marker for the encoded data is present in the email message 119 body. In this way, the encoded data element can be processed by the recipient client application 139 and ignored by client applications that do not support the decoding of encoded data elements.

In another approach, the encoded data element can include data that the sender calendar manager 136 can embed in the header of the email message 119. In one such example, the sender calendar manager 136 can append a header field to the header of the email message 119, and the header field can include data that represents the proposed times for event. In addition, the sender calendar manager 136 can include a marker in the header to indicate to the recipient device 109 that the email message 119 includes the encoded data element. For instance, the sender calendar manager 136 can insert the following string in the header of the email message 119 to specify that the proposed times for the event are Jan. 1, 2015 at 1:30 PM and Jan. 1, 2015 at 2:30 PM: "Times: [2015-01-01: 13:30; 2015-01-01: 14:30]." In this example, the string "Times:" is a marker to indicate to the recipient device 109 that the encoded data element is present in the email message 119. By encoding the proposed times in the header of the email message 119, the encoded data element can be processed by the recipient client application 139 and ignored by client applications that do not support the decoding of encoded data elements.

After the sender calendar manager 136 embeds the encoded data element in the email message 119, the sender client application 133 can transmit the email message 119 to the recipient device 109 through the network 113. The recipient device 109 can then retrieve the transmitted email message 119 through the email server 116.

When the recipient client application 139 accesses the received email message 119, the recipient client application 139 can render content, such as text, in the email message 119. In addition, the recipient calendar manager 143 can parse the email message 119 to determine whether the marker for the encoded data element is present in the email message 119. If the recipient calendar manager 143 determines that the marker is present in the email message 119, the recipient calendar manager 143 can process the email message 119 as will now be described.

For examples in which the encoded data element includes XML code in the body of the email message 119, the recipient calendar manager 143 can extract data from the XML code that specifies the proposed times for the event. For examples in which the encoded data element includes header data, the recipient calendar manager 143 can extract the data in the header of the email message 119 that represents the proposed times for the event.

Once the recipient calendar manager 143 has obtained the data that represents the proposed times for the event, the recipient calendar manager 143 can render representations of the proposed times in a user interface. In some examples, the proposed times can be represented in a user interface element that the recipient calendar manager 143 generates and includes in the same user interface in which the content in the email message 119 is rendered. The user interface element can be, for example, a rectangular region positioned below the rendered content of the email message 119. In this way, the recipient client application 139 can present the user of the recipient device 109 with the content of the body of the email message 119 as well as the proposed times for the event in a single user interface.

In addition to rendering the data representing the proposed times for the event, the recipient calendar manager 143 can determine whether the user of the recipient device 109 is available to attend the event at each proposed time and render this information in the user interface element as well. To this end, the recipient calendar manager 143 can obtain data for an electronic calendar 126 associated with the user of the recipient device 109. For each proposed time for the event, the recipient calendar manager 143 can consult the electronic calendar 126 to determine whether an event entry 129 exists for that proposed time. If an event entry 129 does not exist for a proposed time, the recipient calendar manager 143 can determine that the user may be available to attend the event at that proposed time. Thus, the recipient client application 139 in some examples can render a single user interface that represents content in the body of the email message 119 and a user interface element that represents the proposed times for the event and representations of the user's availability for each proposed time. In another example, the recipient client application 139 can automatically remove proposed times when the recipient is unavailable, providing a list of only available times to the recipient for selection.

After the recipient calendar manager 143 renders the user interface representing the proposed times for the event, the user of the recipient device 109 can select one of those times to be the scheduled time for the event. In alternative examples, the recipient calendar manager 143 can select one of the proposed times automatically without input from the user of the recipient device 109. In one such example, if the user of the recipient device 109 is available to attend the event at only one of the proposed times, the recipient calendar manager 143 can select that proposed time without input from the user. In another example, the user of the recipient device 109 can specify preferences for automatically selecting proposed times. For example, the user can specify a preference that can cause the recipient calendar manager 143 to select the earliest or latest proposed time.

When the user or the recipient calendar manager 143 has selected one of the proposed times, the recipient calendar manager 143 can create an event entry 129 for an electronic calendar 126 associated with the user. When creating the event entry 129, the recipient calendar manager 143 can also include data associated with the email message 119 in the event entry 129. For example, if an attachment or content was included in the email message 119, the attachment and content can be included in the event entry 129.

In addition, once the recipient calendar manager 143 has created the event entry 129 for the event, the recipient calendar manager 143 can transmit an invitation for the event to the sender device 106. The event invitation can include information associated with the event entry 129. For instance, content from the earlier email message 119, data specifying the scheduled time for the event, and data specifying the location of the event can be included with the event invitation.

When the sender device 106 receives the event invitation from the recipient device 109, the sender calendar manager 136 can generate an event entry 129 for an electronic calendar 126 associated with the user of the sender device 106. The event entry 129 for the user of the sender device 106 can include content from the earlier email message 119, data specifying the scheduled time for the event, and data specifying the location of the event can be included with the event invitation. Thus, in the examples described above, the sender client application 133 and the recipient client application 139 can facilitate an event being scheduled between the user of the sender device 106 and the user of the recipient device 109.

In another example, the components described herein can facilitate an event being scheduled between the user of the sender device 106 and multiple users of multiple recipient devices 109, as will now be described.

To begin, the user of the sender device 106 can use the sender client application 133 to compose an email message 119. Similar to the examples discussed above, the email message 119 can include content, such as text, as well as attachments, such as images or word processing documents.

The user of the sender device 106 can also request for the sender calendar manager 136 to include in the email message 119 an encoded data element that specifies one or more proposed times for an event. When the user requests to include the encoded data element in the email message 119, the sender calendar manager 136 can determine times when the user of the sender device 106 is available for the event. In addition, the sender calendar manager 136 can render an electronic calendar 126 associated with the user, including representations of the times the user is available for the event. The user of the sender device 106 can then select one or more of the available times as proposed times for the event.

After the user has specified the proposed times for the event, the sender calendar manager 136 can generate an encoded data element that specifies the one or more proposed times for the event. In various examples, the encoded data element can include XML code or header data, as described above. The sender calendar manager 136 can then include the encoded data element in the email message 119, and the sender client application 133 can transmit the email message 119 to the recipient devices 109 through the network 113.

In some examples, the sender client application 133 can access shared data for electronic calendars 126, such as the electronic calendar 126a associated with the recipient device 109a. However, the sender client application 133 may not have access to shared data for other electronic calendars 126, such as the electronic calendar 126b associated with the recipient device 109b. In such examples, the sender client application 133 can determine whether the sender client application 133 has access to shared data for the electronic calendars 126 associated with the intended recipients. For the intended recipients for which the sender client application 133 can access the shared data, the sender client application 133 can determine the availability of the users based on the shared data. For the intended recipients for which the sender client application 133 does not have access to shared data, the sender client application 133 can generate an email message 119 with an encoded data element using one or more of the approaches described above and transmit the email message 119 to only the recipient devices 109 for which the sender client application 113 does not have access to calendar data.

The recipient devices 109 can then receive copies of the email message 119 through the email servers 116. When the recipient client applications 139 access the received email message 119, the recipient client applications 139 can render content in the email message 119. In addition, each recipient calendar manager 143 can parse the email message 119 to determine whether the marker for the encoded data element is present in the email message 119. If the recipient calendar managers 143 determine that the marker is present in the email message 119, the recipient calendar managers 143 can process the email message 119 as will now be described.

Once the recipient calendar manager 143 determines that the encoded data element is included in the email message 119, the recipient calendar manager 143 can extract the data that represents the one or more proposed times for the event. For examples in which the encoded data element includes XML code in the body of the email message 119, the recipient calendar manager 143 can extract data from the XML code that specifies the proposed times for the event. For examples in which the encoded data element includes header data, the recipient calendar manager 143 can extract the data in the header of the email message 119 that represents the proposed times for the event.

After the recipient calendar manager 143 has obtained the data that represents the proposed times for the event, the recipient calendar manager 143 can render representations of the proposed times in a user interface. The proposed times can be represented in a user interface element that the recipient calendar manager 143 can generate and include in the same user interface in which the content in the email message 119 is rendered. In some examples, the recipient calendar manager 143 can automatically remove proposed times when the recipient is unavailable, providing a list of only available times to the recipient for selection.

In addition to rendering the data representing the proposed times for the event, the recipient calendar manager 143 can determine whether the user of the recipient device 109 is available to attend the event at each proposed time and render this information in the user interface element as well. The recipient calendar manager 143 can represent the user's availability in various ways. In some examples, the recipient calendar manager 143 can generate and render user interface elements that indicate whether the user is available to attend the event at the respective proposed times. In one example, a green user interface element can indicate that the user is available at a proposed time, and a red user interface element can indicate that the user is not available at a proposed time. In this way, the user can easily determine whether he or she is available to attend the event at each of the proposed times.

After the recipient calendar manager 143 renders the user interface representing the proposed times for the event, the user of the recipient device 109 can select one or more of those times to be a selected proposed time for the event. In alternative examples, the recipient calendar manager 143 can select one of the proposed times without input from the user, as described above. In response to the selection, the recipient calendar manager 143 can transmit a response message to the sender device 106 specifying the proposed times that the user of the recipient device 109 selected. In some examples, the response message can be an email message 119 that is responsive to the earlier email message 119 obtained from the sender device 106.

After the sender client application 133 has sent the email message 119 that specified the proposed times for the event, the sender client application 133 can wait to receive the response messages from the recipient devices 109 that specify the respective proposed times the users or the recipient calendar managers 143 selected. For examples in which the response messages are email messages 119, the sender calendar manager 136 can hide these responsive email messages 119 from the user of the sender device 106. In one example, the sender calendar manager 136 can hide the email messages 119 by marking the email messages 119 as "read" email messages 119 even though the email messages 119 have not been presented to the user. In addition, the recipient calendar manager 143 can remove the responsive email messages 119 from an inbox of the user. By hiding the response email messages 119, the sender calendar manager 136 can reduce the amount of email messages 119 that would otherwise be present in the user's inbox.

In some examples, the sender client application 133 can periodically determine whether the recipient devices 109 have provided response messages specifying selected proposed times. If the sender client application 133 has not received a response message from a particular recipient device 109 after a configurable threshold duration, the sender client application 133 can transmit an additional message to the recipient device 109. In addition, the sender client application 133 can assign a "high priority" flag to the additional message to indicate to the recipient that a response message is requested. If, after a configurable threshold duration, the sender client application 133 still does not receive a response message from the recipient device 109, the sender client application 133 can proceed with determining the scheduled time for the event without consideration of a response message from the particular recipient device 109. In addition, the sender client application 133 can invite the user of the recipient device 109 to the event even if the sender client application 133 does not receive a response message from the recipient device 109.

When the sender device 106 has received all of the messages from the recipient devices 109 specifying the proposed times selected, the sender calendar manager 136 can parse the messages and determine the proposed times selected for the event. In some examples, each user can select one proposed time. In other examples, each user can select one or more proposed times.

Once the sender calendar manager 136 has identified the proposed times that the users have selected for the event, the sender calendar manager 136 can determine a scheduled time for the event. Various types of algorithms can be used to determine the scheduled time for the event based on the selected proposed times. In one example, if all users have selected the same proposed time, the sender calendar manager 136 can set that proposed time as being the scheduled time for the event. In other examples, the sender calendar manager 136 can determine the scheduled time based on weighting values assigned to the respective users of the recipient devices 109. For instance, if the user of a first recipient device 109 is a supervisor of the user of a second recipient device 109, the sender calendar manager 136 can assign the user of the first recipient device 109 a higher weighting value relative to the user of the second recipient device 109. When the sender calendar manager 136 has assigned a relatively high weighting value to a particular user, the particular user can have a relatively high influence on which proposed time the sender calendar manager 136 determines as being the scheduled time for the event.

In another example, if the number of users that selected a proposed time satisfies a configurable threshold, the sender calendar manager 136 can set that proposed time as the scheduled time for the event. In another example, the sender calendar manager 136 can determine which proposed time the users have selected the most and then set that proposed time as the scheduled time for the event.

In another example, the sender calendar manager 136 can determine the scheduled time for the event based on a ranking of the proposed times specified by the user of the sender device 106. For example, if the user of the sender device 106 specified that the user prefers particular proposed time for the event over other proposed times, the sender calendar manager 136 can attribute more weight to the preferred proposed time when determining the scheduled time for the event.

In alternative examples, the sender client application 133 can have access to shared calendar data associated with one or more of the recipient devices 109 that represents users' availabilities. In these examples, the sender client application 133 can determine the scheduled time for an event based on a combination of the shared calendar data as well as the proposed times selected by the users of the recipient devices 109.

After the sender calendar manager 136 has determined the scheduled time for the event, the sender calendar manager 136 can create an event entry 129 for an electronic calendar 126 associated with the user of the sender device 106. When creating the event entry 129, the sender calendar manager 136 can include data associated with the earlier email message 119 in the event entry 129. For example, if an attachment or content was included in the email message 119, the attachment and content can be included in the event entry 129.

In addition, once the sender calendar manager 136 has created the event entry 129 for the event, the sender calendar manager 136 can transmit an invitation for the event to the recipient devices 109. The event invitation can include information associated with the event entry 129. For instance, content from the earlier email message 119, data specifying the scheduled time for the event, and data specifying the location of the event can be included with the event invitation.

When the recipient devices 109 receive the event invitation from the sender device 106, the recipient calendar managers 143 can generate event entries 129 for electronic calendars 126 associated with the respective users of the recipient devices 109. The event entries 129 for the user of the recipient devices 109 can include content from the earlier email message 119, data specifying the scheduled time for the event, and data specifying the location of the event can be included with the event invitation. Thus, in the examples described above, the sender client application 133 and the recipient client application 139 can facilitate an event being scheduled between the user of the sender device 106 and multiple users of the recipient devices 109.

Figure 2A:
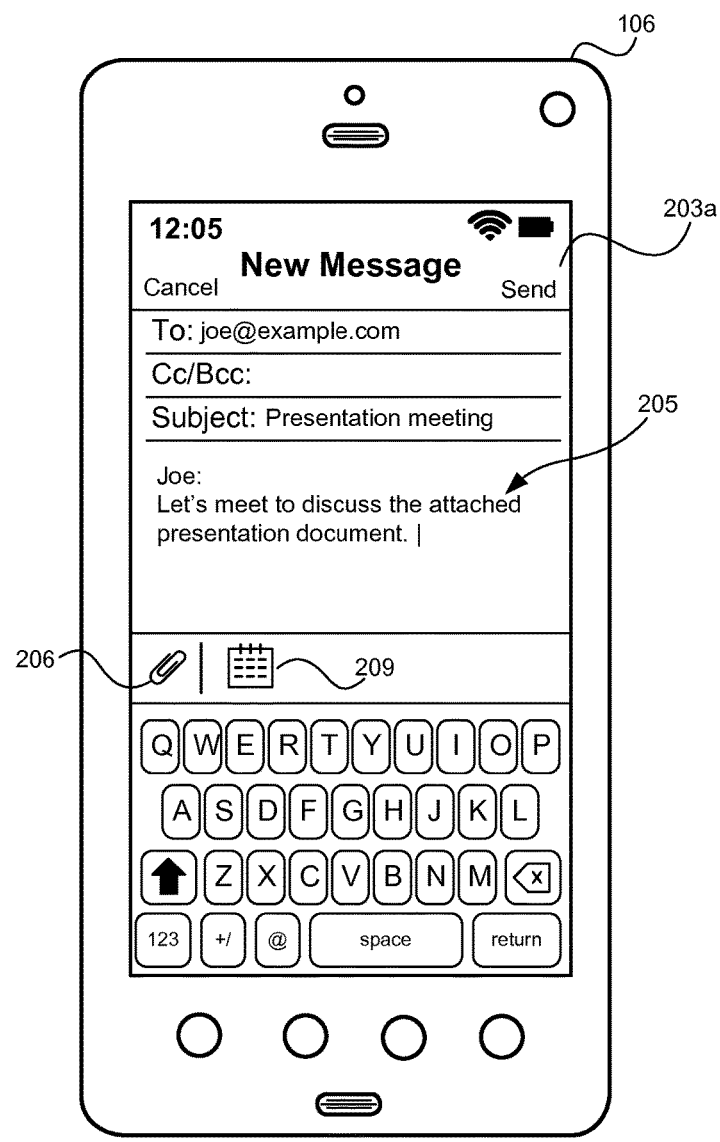
FIGS. 2A-2D are drawings of examples of user interfaces rendered by a sender device.

With reference to FIGS. 2A-2D, an example is provided of the sender device 106 generating an email message 119 with an embedded data element that specifies one or more proposed times for an event. Beginning with FIG. 2A, shown is an example of a user interface 203a for the sender client application 133 rendered by the sender device 106. The user interface 203a can facilitate a user of the sender device 106 composing an email message 119.

In the example illustrated in FIG. 2A, the user of the sender device 106 has generated content 205 for the email message 119. In the example shown in FIG. 2A, the content 205 for the email message 119 includes text for a body of an email message 119.

The user interface illustrated in FIG. 2A also includes an attachment button 206 and a calendar button 209. If the user selects the attachment button 206, the sender client application 133 can prompt the user to specify an attachment, such as an image or word processing document, to include in the email message 119. A user can select the calendar button 209 to request to include in the email message 119 an encoded data element specifying one or more proposed times for an event.

Figure 2B:
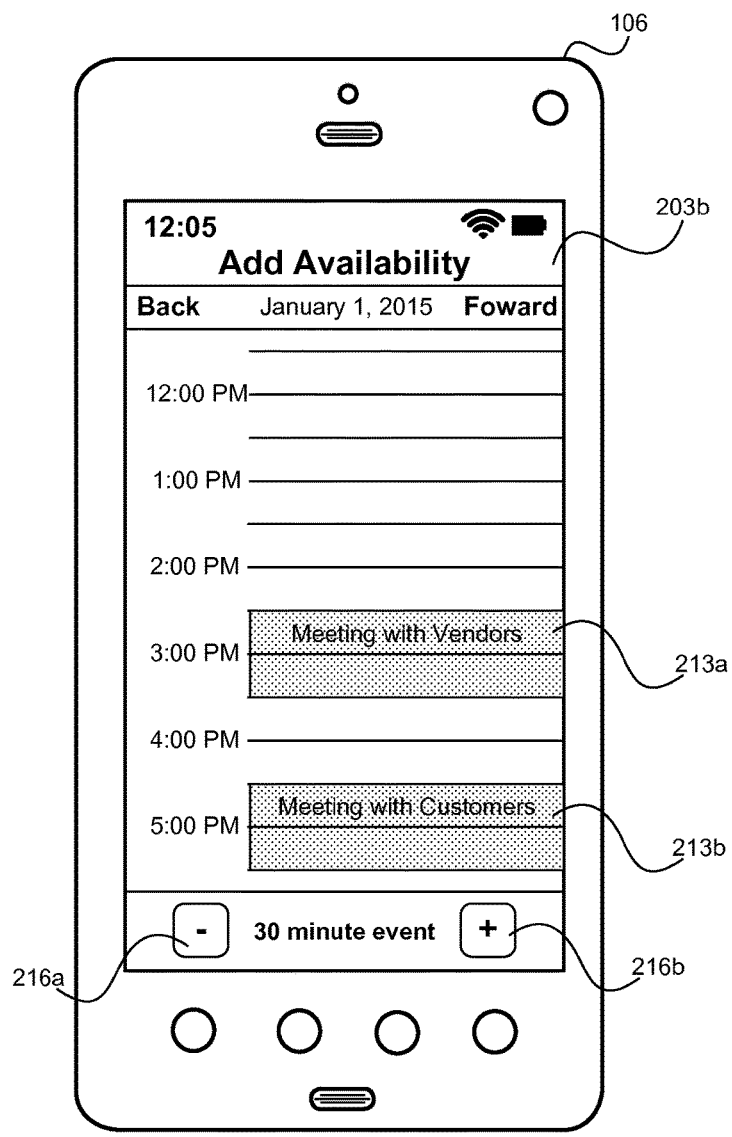

With reference to FIG. 2B, shown is an example of a user interface 203b for the sender calendar manager 136. The user interface 203b shown in FIG. 2B can be generated and rendered in the sender device 106 in response to the user selecting the calendar button 209 of the user interface 203a shown in FIG. 2A. The user interface 203b includes a rendering of a portion of an electronic calendar 126 associated with a user of the sender device 106. In addition, the user interface 203b includes shaded regions 213a-213b to indicate that the user is unavailable for the event at the corresponding times. Thus, for the example illustrated in FIG. 2B, the user is unavailable for the event from 2:30 PM-3:30 PM and from 4:30 PM-5:30 PM.

The user interface 203b can also include time duration buttons 216a-216b. When the user interface 203b is generated, the sender calendar manager 136 can set the duration of the event to be a default value. In the example shown in FIG. 2B, the default value for the event duration is 30 minutes. A user can select the time duration button 216a to reduce the duration of the event. Alternatively, the user can select the time duration button 216b to increase the duration of the event. In this way, the user of the sender device 106 can specify the duration of an event.

Figure 2C:
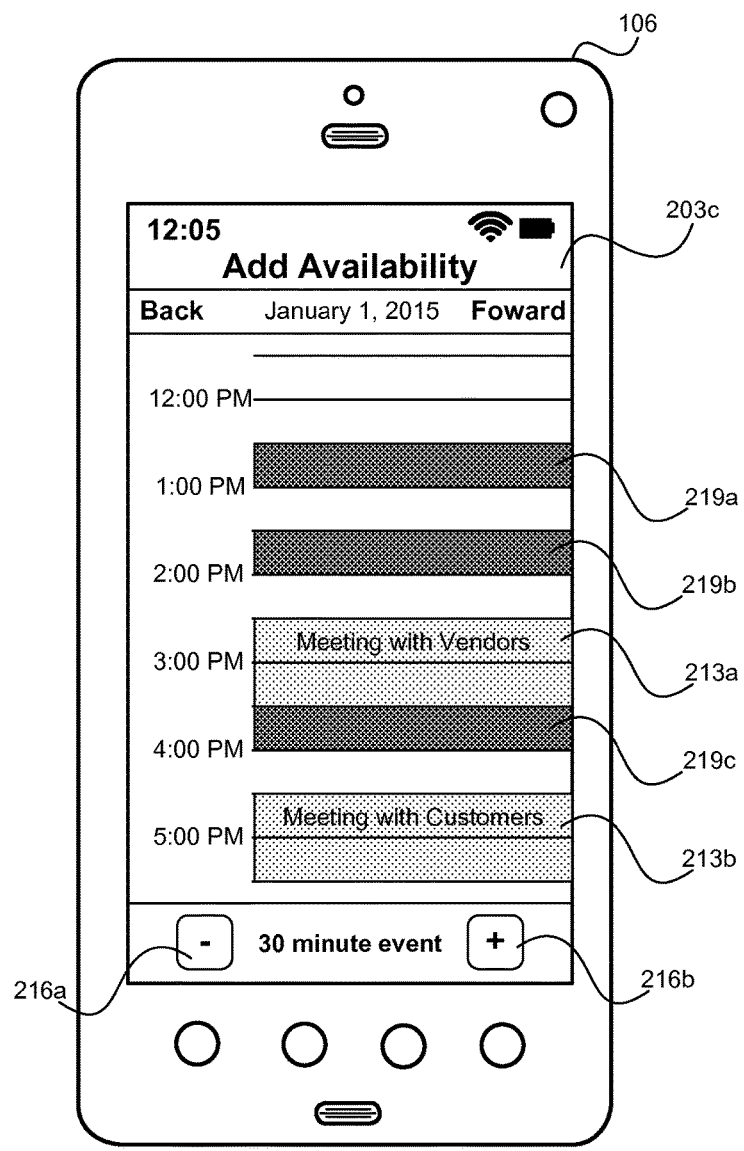

With reference to FIG. 2C, shown is an example of a user interface 203c for the sender calendar manager 136. The user interface 203c shown in FIG. 2C can be generated and rendered after a user has selected proposed times for an event using the user interface 203b shown in FIG. 2B. For the example shown in FIG. 2C, the user has selected the times from 12:30-1:00 PM, 1:30-2:00 PM, and 3:30-4:00 PM as proposed times for an event. As such, the user interface 203c includes user selection regions 219a-219c, which represent the times the user selected for the proposed times for the event. In this way, the user interface 203c can present the user with a representation of the selected proposed times relative to the events that the user is already scheduled to attend. When the user has selected one or more proposed times for the event, the sender calendar manager 136 can generate an encoded data element that specifies the proposed times, as discussed above.

Figure 2D:
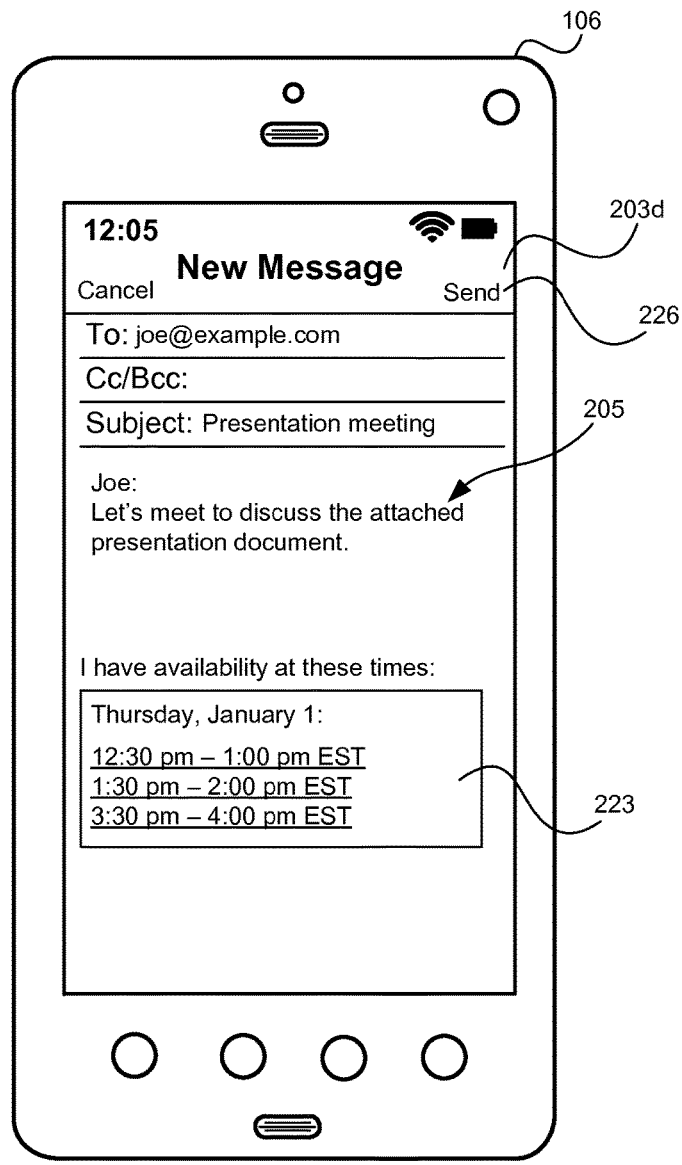

With reference to FIG. 2D, shown is an example of a user interface 203d for the sender client application 133. The sender client application 133 can generate the user interface 203d shown in FIG. 2D after the user has selected proposed times for an event, as discussed above with respect to FIG. 2C. The user interface 203d includes rendering of the content 205 and a user interface element 223. The user interface element 223 presents the proposed times for the event that the user has selected as they are specified by the encoded data element that the sender calendar manager 136 generated.

The user interface 203d also includes a send button 226. If the user of the sender device 106 selects the send button 226, the email message 119, including the encoded data element generated by the sender calendar manager 136, can be transmitted through the network 113 to the recipient device 109.

Figure 3A:
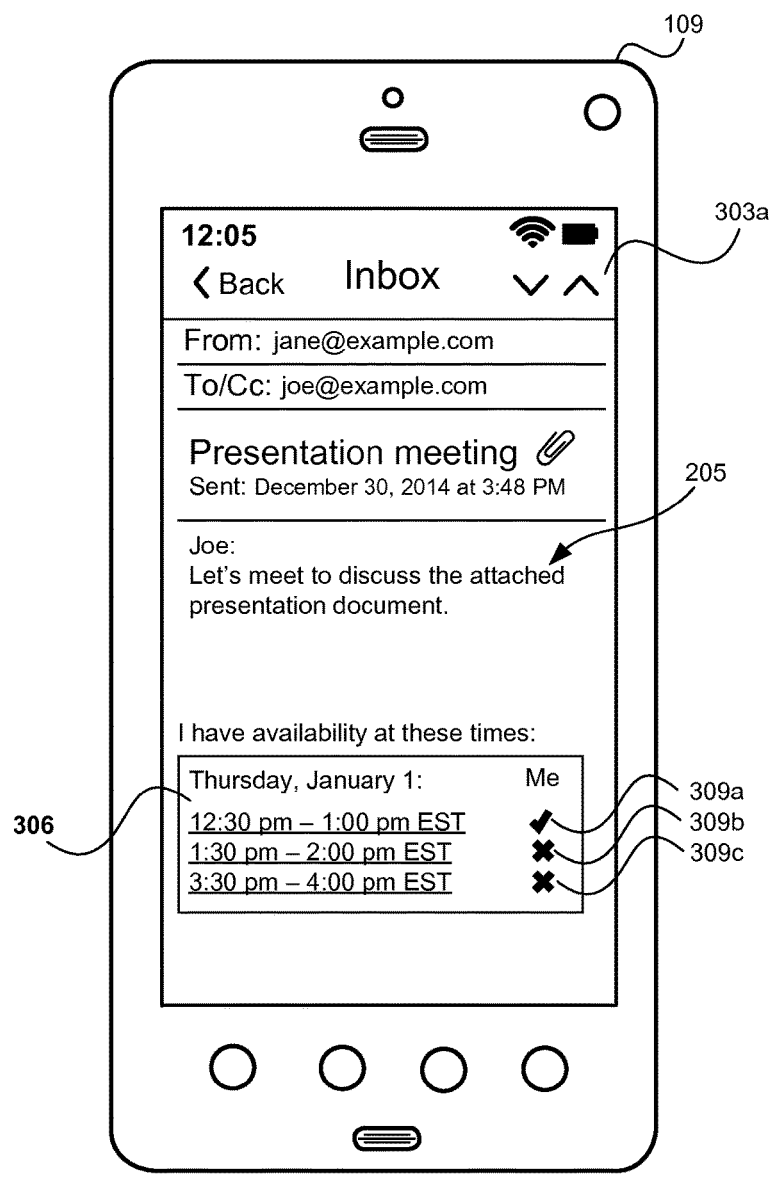
FIGS. 3A-3B are drawings of examples of user interfaces rendered by a recipient device.
Figure 3B:
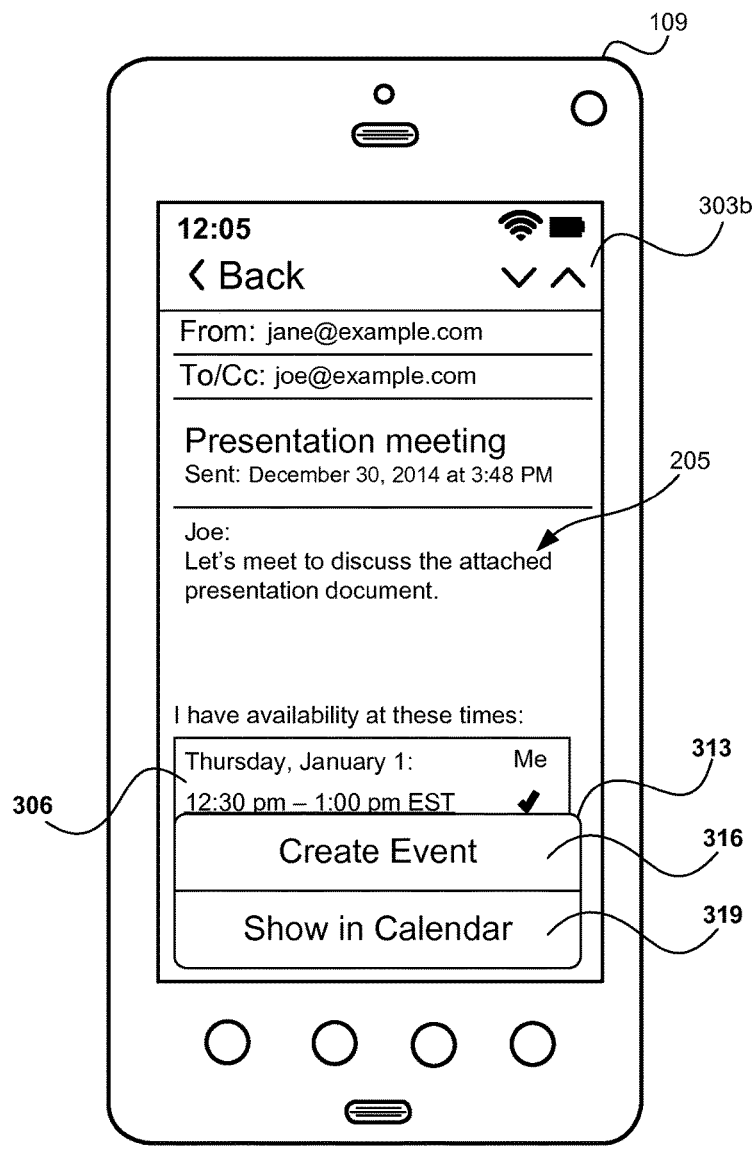

With reference to FIGS. 3A-3B, an example is provided of the recipient device 109 receiving and processing an email message 119 with an embedded data element that specifies one or more proposed times for an event. Beginning with FIG. 3A, shown is an example of a user interface 303a rendered in the recipient device 109. The user interface 303a includes a rendering of the email message 119, including the content 205 generated by the user of the sender device 106. In addition, the user interface 303a includes a user interface element 306, which includes a representation of the proposed times for an event that the user of the sender device 106 selected, as discussed above with respect to FIGS. 2A-2D. In addition, the user interface element 306 includes indicators 309a-309c. The indicators 309a-309c indicate whether an electronic calendar 126 associated with the user of the recipient device 109 indicates that the user is available to attend the event at the respective proposed times. In the example illustrated in FIG. 3A, the indicator 309a is a check mark, which indicates that the user is available to attend the event from 12:30-1:00 PM. The indicator 309b-309c are "x" marks, which indicate that the user is not available to attend the device from 1:30-2:00 PM or 3:30-4:00 PM. In alternative examples, the user interface element 306 can indicate whether a user is available at particular times through the usage of different colors. For instance, the color green can indicate that the user is available at a particular time, and the color red can indicate that the user is not available at the particular time. The user of the recipient device 109 can select one of the proposed times represented in the user interface element 306.

With reference to FIG. 3B, shown is an example of a user interface 303b rendered in the recipient device 109 after the user has selected one of the proposed times represented in the user interface element 306. As shown, in response to the user selecting one of the proposed times, the recipient calendar manager 143a has generated and rendered a prompt 313. The prompt 313 includes a create event button 316 and a show calendar button 319.

If the user of the recipient device 109 selects the create event button 316, the recipient calendar manager 143a can generate an event entry 129 for an electronic calendar 126 for the selected proposed time. In addition, the recipient calendar manager 143a can include information from the email message 119, such as the content 205 and attachments, in the event entry 129. If the user selects the show calendar button 319, the recipient calendar manager 143a can retrieve and render an electronic calendar 126 associated with the user of the recipient device 109.

Figure 4:
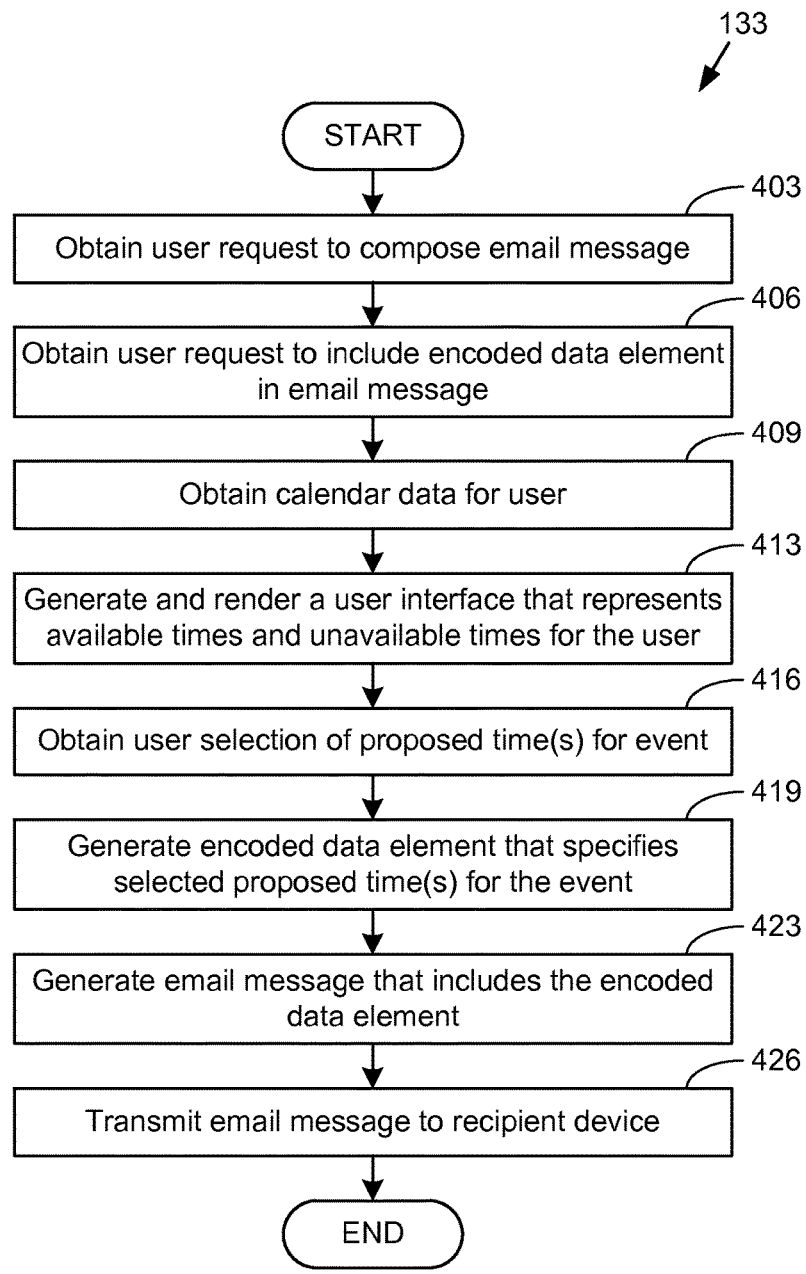
FIG. 4 is a flowchart illustrating an example of functionality implemented by a sender client application in a sender device.

With reference to FIG. 4, shown is a flowchart that provides an example of a portion of the operation of the sender client application 133. In particular, FIG. 4 provides an example of the sender client application 133 generating and transmitting to a recipient device 109 an email message 119 that includes an encoded data element specifying proposed times for an event. Additionally, the flowchart of FIG. 4 can be viewed as depicting an example of steps of a method implemented in the sender device 106.

Beginning with step 403, the sender client application 133 can obtain a user request to compose an email message 119. At step 406, the sender client application 133 can obtain a user request to include an encoded data element in the email message 119. In some examples, the user request can include a user selecting the calendar button 209 shown in FIG. 2A.

The sender client application 133 can then move to step 409 and obtain the data for an electronic calendar 126 associated with the user of the sender device 106. As indicated at step 413, the sender client application 133 can generate and render a user interface that represents the times that the user is available and not available for the event. An example of such a user interface is the user interface 203b, which is shown in FIG. 2B. In some examples, the recipient may use the same computing environment 103 as the sender, such as when the sender and recipient work at the same organization. In those examples, the recipient's availability can also be retrieved and shown to the sender. For example, the MICROSOFT OUTLOOK email client can display the availability of other users on a shared MICROSOFT EXCHANGE server. Availability, however, may not be accessible for recipients of other organizations, such as other organizations using other email servers 116.

At step 416, the sender client application 133 can then obtain a user selection of one or more proposed times for an event. Then, at step 419, the sender client application 133 can generate an encoded data element that specifies the selected one or more proposed times for the event. As discussed above, the encoded data element can include, for example, XML data or header data.

As shown at step 423, the sender client application 133 can then generate an email message 119 that includes the encoded data element. The sender client application 133 can then transmit the email message 119 to the recipient device 109, as indicated at step 426. Thereafter, the process ends.

Figure 5A:
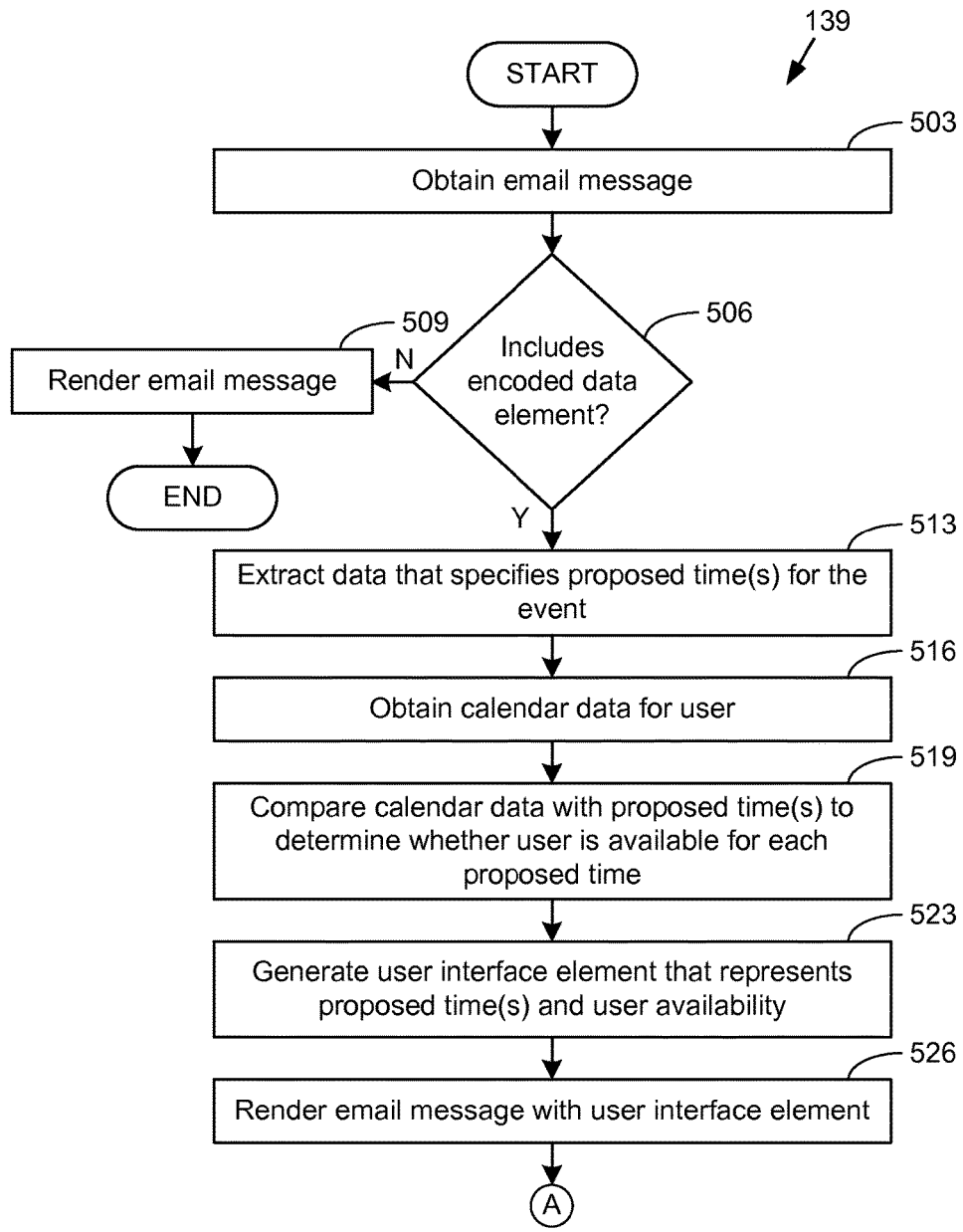
FIGS. 5A-5B is a flowchart illustrating an example of functionality implemented by a recipient client application in a recipient device.
Figure 5B:
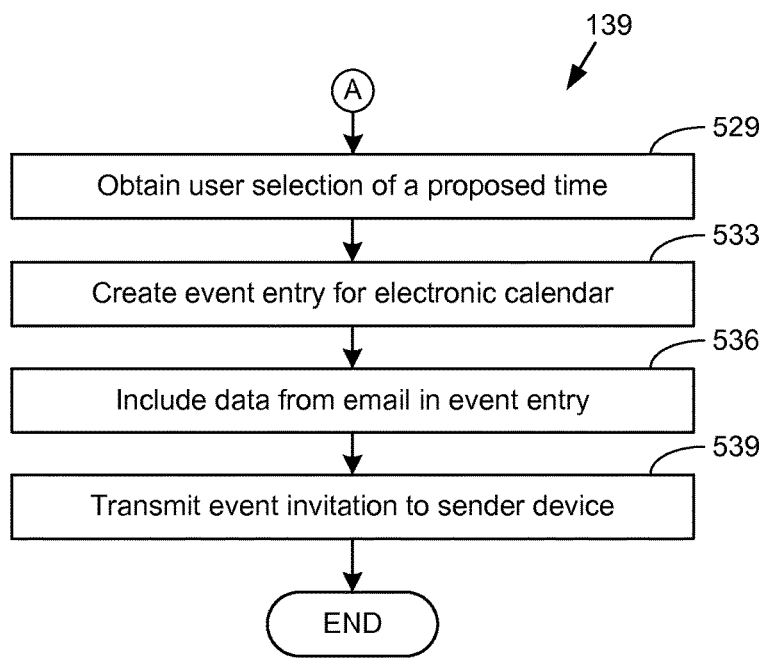

With reference to FIGS. 5A-5B, shown is a flowchart that provides an example of a portion of the operation of the recipient client application 139a. In particular, FIGS. 5A-5B provide an example of the recipient client application 139 processing an email message 119 that includes an encoded data element specifying proposed times for an event. Additionally, the flowchart of FIGS. 5A-5B can be viewed as depicting an example of steps of a method implemented in the recipient device 109.

Beginning with step 503, the recipient client application 139 can obtain an email message 119. At step 506, the recipient client application 139 can determine whether the email message 119 includes an encoded data element. In some examples, the recipient client application 139 can determine whether the email message 119 includes an encoded data element by parsing the email message 119 and determining whether a marker for an encoded data element is present in the email message 119, as described above.

If an encoded data element is not included in the email message 119, the recipient client application 139 can move to step 509 and render the email message 119. Thereafter, the process ends.

Otherwise, at step 506, if an encoded data element is present in the email message 119, the recipient client application 139 can move to step 513. At step 513, the recipient client application 139 can extract data from the encoded data element that represents one or more proposed times for an event.

As shown at step 516, the recipient client application 139 can obtain data for an electronic calendar 126 associated with a user of the recipient device 109. At step 519, the recipient client application 139 can then compare the data for the electronic calendar 126 with the one or more proposed times specified in the encoded data element to determine whether the user is available for each proposed time. The recipient client application 139 can then move to step 523 and generate a user interface element that represents the one or more proposed times for the event as well as the user's availability for those times. At step 526, the recipient client application 139 can render the email message 119 and the generated user interface element. An example of such a user interface element is the user interface element 306 that is shown in FIG. 3A.

As indicated at step 529, the recipient client application 139 can then obtain a user selection of one of the proposed times specified in the encoded data element. In response, the recipient client application 139 can create an event entry 129 for an electronic calendar 126 associated with the user of the recipient device 109, as indicated at step 533. As shown at step 536, the recipient client application 139 can then include data from the email message 119 in the event entry 129. For example, content and attachments for the email message 119 can be included in the event entry 129.

At step 539, the recipient client application 139 can then transmit an event invitation to the sender device 106. Thereafter, the process ends.

Figure 6:
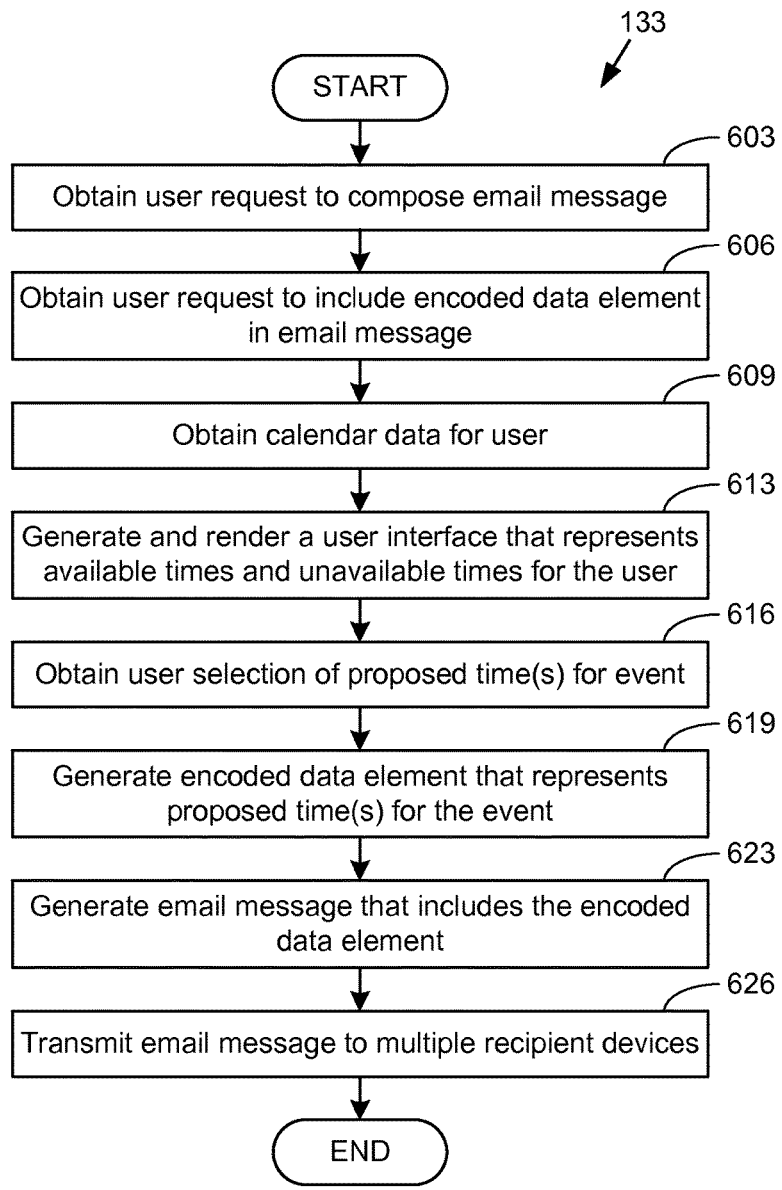
FIG. 6 is a flowchart illustrating another example of functionality implemented by a sender client application in a sender device.

With reference to FIG. 6, shown is a flowchart that provides an example of a portion of the operation of the sender client application 133. In particular, FIG. 6 provides an example of the sender client application 133 transmitting an email message 119 with an encoded data element to multiple recipient devices 109. Additionally, the flowchart of FIG. 6 can be viewed as depicting an example of steps of a method implemented in the sender device 106.

Beginning with step 603, the sender client application 133 can obtain a user request to compose an email message 119. At step 606, the sender client application 133 can obtain a user request to include an encoded data element in the email message 119. In some examples, the user request can include a user selecting the calendar button 209 shown in FIG. 2A.

The sender client application 133 can then move to step 609 and obtain the data for an electronic calendar 126 associated with the user of the sender device 106. As indicated at step 613, the sender client application 133 can generate and render a user interface that represents the times that the user is available and not available for the event. An example of such a user interface is the user interface 203b, which is shown in FIG. 2B. As discussed above, in some systems, availability of certain recipients can also be available, such as when the sender and some recipients work at the same organization. However, other recipients' availability may be unknown.

At step 616, the sender client application 133 can then obtain a user selection of one or more proposed times for an event. Then, at step 619, the sender client application 133 can generate an encoded data element that specifies the selected one or more proposed times for the event. As discussed above, the encoded data element can include, for example, XML data or header data.

As shown at step 623, the sender client application 133 can then generate an email message 119 that includes the encoded data element. The sender client application 133 can then transmit the email message 119 to the recipient devices 109, as indicated at step 626. Thereafter, the process ends.

Where the calendar information of some recipients is already available to a sender in the same organization, one example can send the encoded data element and email message 119 to only users for which availability is unknown. Once responses from the recipients are received, the availability from the responses and the recipients with shared calendar information can be combined, without requiring an initial email message 119 and response from recipients whose availability is already known by the sender client application 133.

Figure 7A:
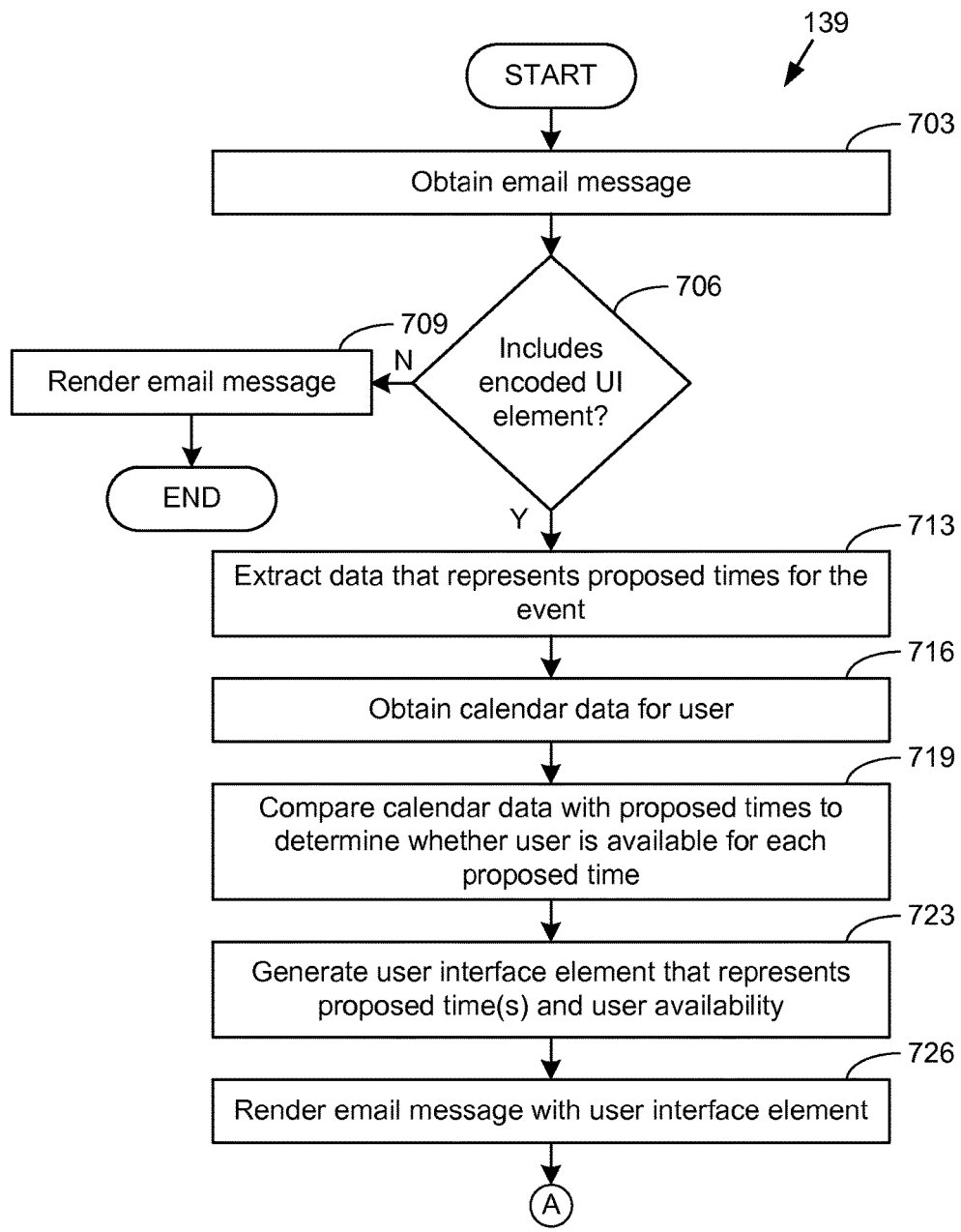
FIGS. 7A-7B is a flowchart illustrating another example of functionality implemented by a recipient client application in a recipient device.
Figure 7B:
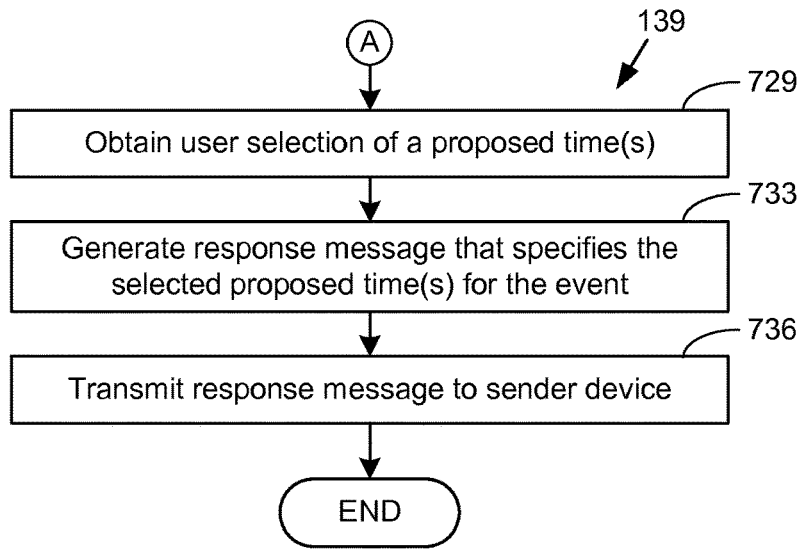

With reference to FIGS. 7A-7B, shown is a flowchart that provides an example of a portion of the operation of the recipient client application 139. In particular, FIGS. 7A-7B provide an example of the recipient client application 139 processing an email message 119 that includes an encoded data element specifying proposed times for an event. Additionally, the flowchart of FIGS. 7A-7B can be viewed as depicting an example of steps of a method implemented in the recipient device 109.

Beginning with step 703, the recipient client application 139 can obtain an email message 119. At step 706, the recipient client application 139 can determine whether the email message 119 includes an encoded data element. In some examples, the recipient client application 139 can determine whether the email message 119 includes an encoded data element by parsing the email message 119 and determining whether a marker for an encoded data element is present in the email message 119, as described above.

If an encoded data element is not included in the email message 119, the recipient client application 139 can move to step 709 and renders the email message 119. Thereafter, the process ends.

Otherwise, at step 706, if an encoded data element is present in the email message 119, the recipient client application 139 can move to step 713. At step 713, the recipient client application 139 can extract data from the encoded data element that represents one or more proposed times for an event.

As shown at step 716, the recipient client application 139 can obtain data for an electronic calendar 126 associated with a user of the recipient device 109. The recipient client application 139 can then compare the data for the electronic calendar 126 with the one or more proposed times specified in the encoded data element to determine whether the user is available for each proposed time, as shown at step 719. The recipient client application 139 can then move to step 723 and generate a user interface element that represents the one or more proposed times for the event as well as the user's availability for those times. At step 726, the recipient client application 139 can render the email message 119 and the generated user interface element. An example of such a user interface element is the user interface element 306 that is shown in FIG. 3A.

As indicated at step 729, which is shown in FIG. 7B, the recipient client application 139 can then obtain a user selection of one of the proposed times specified in the encoded data element. At step 733, the recipient client application 139 can generate a responsive message that specifies the one or more proposed times that the user selected for the event. As discussed above, in some examples, the responsive message can be an email message 119.

The recipient client application 139 can then move to step 736 and transmit the responsive message to the sender device 106. Thereafter, the process ends.

Figure 8:
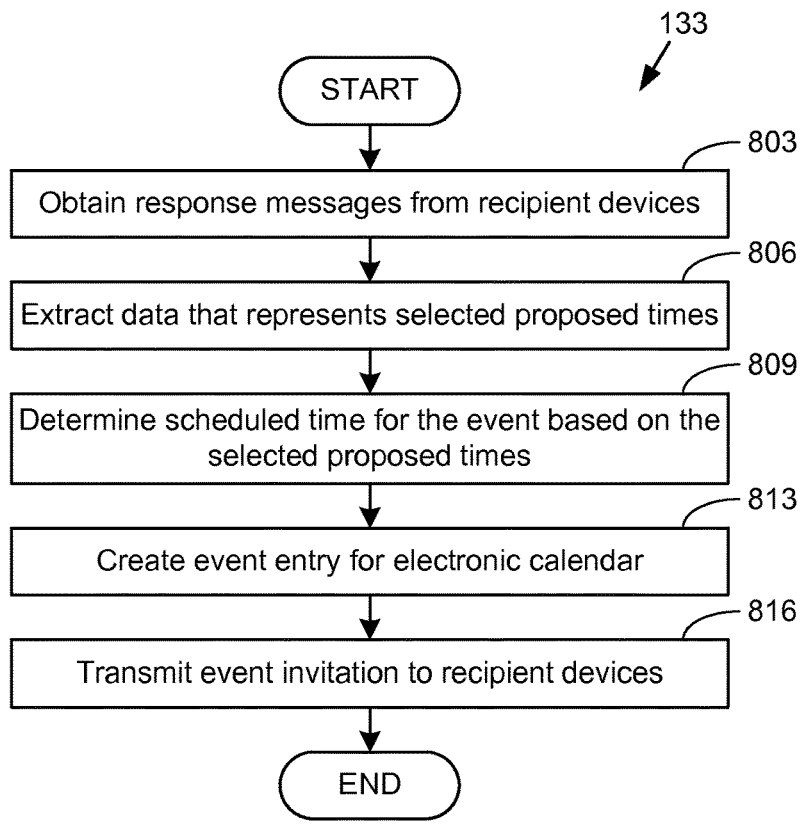
FIG. 8 is a flowchart illustrating an example of functionality implemented by a sender client application in a sender device.

With reference to FIG. 8, shown is a flowchart that provides an example of a portion of the operation of the sender client application 133. In particular, FIG. 8 provides an example of the sender client application 133 generating an event entry 129 for an electronic calendar 126 and transmitting event invitations to multiple recipient devices 109. Additionally, the flowchart of FIG. 8 can be viewed as depicting an example of steps of a method implemented in the sender device 106.

Beginning with step 803, the sender client application 133 can obtain response messages from the recipient devices 109 that are responsive to the email message 119 transmitted by the sender device 106 that included the encoded data element. At step 806, the sender client application 133 can extract the data that represents the proposed times that the users of the recipient devices 109 selected for an event. The sender client application 133 can mark the response messages as "read" and remove the response messages from the sender's inbox. This sender client application 133 can collate the response messages by parsing the response messages and automatically creating a new email in the sender's inbox that summarizes the availability of all recipients based on their responses and shared calendar information, when available.

The sender client application 133 can then move to step 809 and determine the scheduled time for the event based on the proposed times selected by the users of the recipient devices 109. The selected time can be chosen based on the responses and based on shared calendar information for users whose calendar and availability are known by the client application 133. As described above, the sender client application 133 can use various algorithms to determine the scheduled time. In one example, if all users have selected a particular proposed time, the sender client application 133 can set the particular proposed time as being the scheduled time for the event. In other examples, the sender client application 133 can determine the scheduled time based on weighting values assigned to the respective users of the recipient devices 109. In some examples, the recipients can select multiple times when the recipient is available, and can also select a preferred time. This can increase the likelihood that the sender client application 133 will be able to automatically schedule an event with many people.

As indicated at step 813, the sender client application 133 can create an event entry 129 for an electronic calendar 126 associated with a user of the sender device 106. Then, the sender client application 133 can transmit an event invitation to the recipient devices 109, as shown at step 816. Thereafter, the process ends.

The flowcharts of FIGS. 4, 5A-5B, 6, 7A-7B, and 8 show examples of the functionality and operation of implementations of components described herein. The components of the networked environment 100 described herein can be embodied in hardware, software, or a combination of hardware and software. If embodied in software, each step in the flowcharts of FIGS. 4, 5A-5B, 6, 7A-7B, and 8 can represent a module or a portion of code that comprises computer instructions to implement the specified logical functions. The computer instructions can be embodied in the form of source code that comprises human-readable statements written in a programming language or machine code that comprises machine instructions recognizable by a suitable execution system, such as a processor in a computer system or other system. If embodied in hardware, each step can represent a circuit or a number of interconnected circuits that implement the specified logical functions.

Although the flowcharts show a specific order of execution, it is understood that the order of execution can differ from that which is shown. For example, the order of execution of two or more steps can be switched relative to the order shown. Also, two or more steps shown in succession can be executed concurrently or with partial concurrence. Further, in some examples, one or more of the steps shown in the flowcharts can be skipped or omitted. In addition, any number of counters, state variables, warning semaphores, or messages can be added to the logical flow described herein, for purposes of enhanced utility, accounting, performance measurement, or troubleshooting aid. All such variations are within the scope of the present disclosure.

The computing environment 103, sender device 106, recipient device 109, and other components described herein can each include at least one processing circuit. Such a processing circuit can comprise one or more processors and one or more storage devices that are coupled to a local interface. The local interface can comprise a data bus with an accompanying address/control bus.

A storage device for a processing circuit can store data and components that are executable by the one or more processors of the processing circuit. In some examples, the email server 116, the sender client application 133, and the recipient client application 139 can be stored in one or more storage devices and be executable by one or more processors. Also, the data store 123 can be located in the one or more storage devices.

The email server 116, sender device 106, recipient device 109, and other components described herein can be embodied in the form of hardware, as software components that are executable by hardware, or as a combination of software and hardware. If embodied as hardware, the components described herein can be implemented as a circuit or state machine that employs any suitable hardware technology. Such hardware technology includes, for example, one or more microprocessors, discrete logic circuits having logic gates for implementing various logic functions upon an application of one or more data signals, application specific integrated circuits (ASICs) having appropriate logic gates, or programmable logic devices, such as field-programmable gate array (FPGAs) and complex programmable logic devices (CPLDs).

Also, one or more or more of the components described herein that include software or computer instructions can be embodied in any non-transitory computer-readable medium for use by or in connection with an instruction execution system such as, for example, a processor in a computer system or other system. Such a computer-readable medium can contain, store, and maintain the software or computer instructions for use by or in connection with the instruction execution system.

A computer-readable medium can include a physical media, such as, magnetic, optical, semiconductor, or other suitable media. Examples of a suitable computer-readable media include solid-state drives, magnetic drives, flash memory, and storage discs, such as compact discs (CDs). Further, any logic or component described herein can be implemented and structured in a variety of ways. For example, one or more components described can be implemented as modules or components of a single application. Further, one or more components described herein can be executed in one computing device or by using multiple computing devices.

The examples described above are merely examples of implementations to set forth for a clear understanding of the principles of the disclosure. Many variations and modifications can be made to the examples described above without departing substantially from the spirit and principles of the disclosure. All such modifications and variations are intended to be included herein within the scope of this disclosure.

Therefore, the following is claimed:

1. A non-transitory computer-readable medium storing a plurality of computer instructions executable by a computing device, the plurality of computer instructions being configured to cause the computing device to at least:
   generate an email message comprising an encoded data element that specifies a plurality of proposed times for an event, wherein the encoded data element comprises data embedded in at least one of a header of the email message or a body of the email message;
   transmit the email message to at least a first recipient device and a second recipient device;
   obtain a first response to the email message from the first recipient device, wherein the first response specifies a first selected proposed time;
   obtain a second response to the email message from the second recipient device, wherein the second response specifies a second selected proposed time;
   create a summary email message in a sender inbox based on the first response and the second response, the summary email message providing a summary of an availability of each recipient according to a collation of the first response and the second responses;
   determine a time for the event based at least in part on a ranking of the plurality of proposed times specified by a user of a sender device, the first response, and the second response; and
   transmit an invitation for the event to the first recipient device and the second recipient device in response to determining the time.

2. The non-transitory computer-readable medium of claim 1, wherein the computer instructions are further configured to cause the computing device to at least:

generate, in response to determining the time, a calendar event for an electronic calendar, the invitation including the calendar event.

3. The non-transitory computer-readable medium of claim 1, wherein the first response comprises a first email message and the second response comprises a second email message, and wherein the computer instructions are further configured to cause the computing device to at least hide the first email message and the second email message from a user.

4. The non-transitory computer-readable medium of claim 1, wherein the encoded data element that specifies the plurality of proposed times for the event comprises hypertext markup language code.

5. The non-transitory computer-readable medium of claim 1, wherein the encoded data element comprises a marker that identifies that the email message comprises the encoded data element.

6. The non-transitory computer-readable medium of claim 1, wherein the computer instructions are configured to cause the computing device to determine the time for the event by at least weighting the first response from the first recipient device differently than the second response from the second recipient device.

7. The non-transitory computer-readable medium of claim 1, wherein the encoded data element that specifies the plurality of proposed times for the event is encoded to be ignored by applications that do not support encoded data element processing.

8. The non-transitory computer-readable medium of claim 1, wherein the computer instructions are configured to further cause the computing device to at least receive the ranking of the plurality of preferred times from the sender device.

9. A system, comprising:
a computing device; and
a client application executable by the computing device, wherein the client application, when executed by the computing device, is configured to cause the computing device to at least:
generate an email message comprising an encoded data element that specifies a plurality of proposed times for an event, wherein the encoded data element comprises data embedded in at least one of a header of the email message or a body of the email message;
transmit the email message to at least a first recipient device and a second recipient device, wherein calendar data associated with the first recipient device and the second recipient device is not shared with the client application;
obtain a first response to the email message from the first recipient device, wherein the first response specifies a first selected proposed time;
obtain a second response to the email message from the second recipient device, wherein the second response specifies a second selected proposed time;
obtain shared calendar data associated with a third recipient device;
create a summary email message in a sender inbox based on the first response and the second response, the summary email message providing a summary of an availability of each recipient according to a collation of the first response and the second response;
determine a time for the event according to at least a ranking of the plurality of proposed times specified by a user of a sender device, the first response, and the second response; and
transmit an invitation to the event to the first recipient device and the second recipient device in response to determining the time.

10. The system of claim 9, wherein the first response comprises a first email message and the second response comprises a second email message, and wherein the client application is further configured to cause the computing device to at least hide the first email message and the second email message from a user.

11. The system of claim 9, wherein the encoded data element that specifies the plurality of proposed times for the event comprises hypertext markup language code.

12. The system of claim 9, wherein the encoded data element comprises a marker that identifies that the email message comprises the encoded data element.

13. The system of claim 9, wherein the client application is configured to cause the computing device to determine the time for the event by at least weighting the first response from the first recipient device and the second response from the second recipient device.

14. The system of claim 9, wherein the client application is further configured to cause the computing device to at least:
display a representation of a plurality of available times for a user of the client application; and
obtain user selections of the plurality of proposed times for the event from among the available times.

15. The system of claim 14, wherein the representation indicates, based at least in part on the shared calendar data, whether a user of the third recipient device is available at the plurality of available times.

16. A method, comprising:
generating an email message comprising an encoded data element that specifies a plurality of proposed times for an event, wherein the encoded data element comprises data embedded in at least one of a header of the email message or a body of the email message;
transmitting the email message to at least a first recipient device and a second recipient device;
obtaining a first response to the email message from the first recipient device, wherein the first response specifies a first selected proposed time;
obtaining a second response to the email message from the second recipient device, wherein the second response specifies a second selected proposed time;
creating a summary email message in a sender inbox based on the first response and the second response, the summary email message providing a summary of an availability of each recipient according to a collation of the first response and the second response;
determining a time for the event according to at least a ranking of the plurality of proposed times specified by a user of a sender device, the first response, and the second response; and
transmitting an invitation to the event to the first recipient device and the second recipient device in response to determining the time.

17. The method of claim 16, wherein the first response comprises a first email message, and wherein the second response comprises a second email message.

18. The method of claim 17, further comprising designating the first email message and the second email message as a plurality of read email messages without the first email message or the second email message being presented to a user.

19. The method of claim 17, further comprising removing the first email message and the second email message from the sender inbox without the first email message or the second email message being presented to a user.

20. The method of claim 16, further comprising hiding the first response and the second response from a user.

\* \* \* \* \*